United States Patent
Christopher et al.

(10) Patent No.: US 9,589,397 B1
(45) Date of Patent: Mar. 7, 2017

(54) SECURING INTERNET OF THINGS (IOT) BASED ENTRANCE/EXIT WITH MULTI-FACTOR AUTHENTICATION

(71) Applicant: AMERICAN MEGATRENDS, INC., Norcross, GA (US)

(72) Inventors: Samvinesh Christopher, Suwanee, GA (US); Joseprabu Inbaraj, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 15/174,307

(22) Filed: Jun. 6, 2016

(51) Int. Cl.
| | |
|---|---|
| G05B 19/00 | (2006.01) |
| G05B 23/00 | (2006.01) |
| G08B 29/00 | (2006.01) |
| H04B 1/00 | (2006.01) |
| B60R 25/24 | (2013.01) |
| G07C 9/00 | (2006.01) |
| H04L 29/08 | (2006.01) |
| H04W 4/00 | (2009.01) |
| H04L 9/08 | (2006.01) |
| H04L 9/32 | (2006.01) |

(52) U.S. Cl.
CPC ........ G07C 9/00007 (2013.01); H04L 9/0863 (2013.01); H04L 9/3228 (2013.01); H04L 67/12 (2013.01); H04W 4/008 (2013.01); G07C 2009/00412 (2013.01); G07C 2009/00769 (2013.01)

(58) Field of Classification Search
CPC .................................................. G07C 9/00007
See application file for complete search history.

(56) References Cited

U.S. PATENT DOCUMENTS

| | | | | |
|---|---|---|---|---|
| 7,286,848 B2* | 10/2007 | Vireday | .................. | H04L 67/04 |
| | | | | 455/410 |
| 2003/0114190 A1* | 6/2003 | Want | .................... | H04L 63/0209 |
| | | | | 455/557 |
| 2006/0069926 A1* | 3/2006 | Ginter | ................ | H04N 21/8358 |
| | | | | 713/194 |
| 2013/0067564 A1* | 3/2013 | Fok Ah Chuen | ... | G06F 21/6218 |
| | | | | 726/17 |
| 2013/0212694 A1* | 8/2013 | Castiglia | ................. | G06F 21/60 |
| | | | | 726/26 |

* cited by examiner

*Primary Examiner* — Joseph Feild
*Assistant Examiner* — Pameshanand Mahase
(74) *Attorney, Agent, or Firm* — Locke Lord LLP; Tim Tingkang Xia, Esq.

(57) ABSTRACT

Certain aspects direct to systems and methods for securing an internet of things (IoT) based entrance for a designated area with multi-factor authentication. The system includes an IoT based entrance having an IoT device, which stores a secret key for generating a time-based password. An authenticated identification device may also have the same secret key. When the IoT device receives a request from an identification device to establish a secured connection, the IoT device first verifies the wireless address of the identification device. Once the wireless address is verified, the IoT device establishes the secured connection with the identification device through the wireless network. Then the IoT device uses the secret key and a current access time to generate the time-based password, and receive a second time-based password from the identification device through the secured connection. If both time-based passwords match each other, the identification device is authenticated.

20 Claims, 4 Drawing Sheets

SECURING INTERNET OF THINGS (IOT) BASED ENTRANCE/EXIT WITH MULTI-FACTOR AUTHENTICATION

FIELD

The present disclosure relates generally to internet of things (IoT) technology, and more particularly to systems and methods for securing IoT based entrances/exits with multi-factor authentication.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Automatic doors with security access control are commonly used as the entrance/exit of secured areas, such as office or residence buildings. Generally, to identify an authenticated user who has access to the secured area, an identification device may be provided. For example, the identification device may be a badge or other electronic devices, which may be used to communicate with a monitoring device of the automatic door. When the monitoring device detects the information of the identification device and successful authenticate the identity of the user, the monitoring device may unlock the automatic door, such that the authenticated user may enter the door.

However, the security of the identification device accessing the entrance/exit is generally insured only by one type of the authentication process. For example, a mobile device may be used as the identification device, and modifying a mobile device so as to spoof the authentication means is easy and will compromise the security.

Therefore, an unaddressed need exists in the art to address the aforementioned deficiencies and inadequacies.

SUMMARY

Certain aspects of the disclosure direct to a system, which includes at least one internet of things (IoT) based entrance for a designated area. In certain embodiments, each of the at least one IoT based entrance includes an IoT device, and the IoT device includes a processor and a storage device storing computer executable code and a secret key for generating a first time-based password. The computer executable code, when executed at the processor, is configured to: receive, from an identification device through a wireless network, a request to establish a secured connection, wherein the request comprises a wireless address of the identification device; verify the wireless address of the identification device; when the wireless address of the identification device is verified, establish the secured connection with the identification device through the wireless network; receive, from the identification device through the secured connection, a second time-based password generated by the identification device; generate the first time-based password based on an access time and the secret key; determine whether the second time-based password received from the identification device matches the first time-based password generated by the IoT device; and when the second time-based password received from the identification device matches the first time-based password, control the IoT based entrance to grant access to a user of the identification device.

In certain embodiments, the identification device is a mobile device storing a copy of the secret key, where the mobile device is configured to obtain permission for the user of the identification device by: generating the request with the wireless address of the mobile device, and sending the request to the IoT device through the wireless network to establish the secured connection with the IoT device through the wireless network; receiving, from the IoT device, a notification to establish the secured connection; in response to the notification, generating the second time-based password based on the access time and the secret key; and sending the password to the IoT device through the secured connection to obtain permission for the user of the identification device.

In certain embodiments, the mobile device is further configured to: obtain the copy of the secret key from a remote computing device through a network, wherein the network is independent and separate from the wireless network.

In certain embodiments, the remote computing device comprises a random secret key generator to generate the secret key.

In certain embodiments, the wireless network is a Bluetooth network.

In certain embodiments, each of the at least one IoT based entrance comprises a door controlled by the IoT device, and the IoT device is configured to control the IoT based entrance to grant access to the user of the identification device by opening or unlocking the door.

In certain embodiments, the computer executable code is further configured to, when the second time-based password received from the identification device does not match the first time-based password, control the IoT based entrance to deny access to the user of the identification device.

In certain embodiments, the computer executable code includes: a data store storing a plurality of authenticated wireless addresses and the secret key; a wireless connection module configured to: receive the request to establish the secured connection; establish the secured connection with the identification device through the wireless network; and receive the second time-based password through the secured connection; an address filtering module configured to: retrieve the wireless address of the identification device from the request, compare the wireless address of the identification device with the authenticated wireless addresses stored in the data store, and determine that the wireless address of the identification device is verified when the wireless address of the identification device matches with one of the authenticated wireless addresses stored in the data store; a password verification module configured to: obtain a current time as the access time of the identification device, retrieve the secret key from the data store, generate the time-based one time password based on the access time and the secret key, and determine whether the password received from the identification device matches the time-based one time password generated by the IoT device; and an entrance control module configured to, when the password received from the identification device matches the time-based one time password, control the IoT based entrance to grant access to the user of the identification device.

In certain embodiments, the data store stores a plurality of secret keys, and the password verification module is configured to retrieve the secret key by selecting, from the plurality of secret keys, one of the secret keys corresponding to the identification device based on the wireless address of the identification device.

Certain aspects of the disclosure direct to a method for securing an IoT based entrance for a designated area with multi-factor authentication, which includes: receiving, at an IoT device of the IoT based entrance, a request to establish a secured connection from an identification device through a wireless network, wherein the IoT device is configured to store a secret key for generating a first time-based password, and the request comprises a wireless address of the identification device; verifying, by the IoT device, the wireless address of the identification device; when the wireless address of the identification device is verified, establishing, by the IoT device, the secured connection with the identification device through the wireless network; receiving, by the IoT device, a second time-based password generated by the identification device from the identification device through the secured connection; generating, by the IoT device, the first time-based password based on an access time and the secret key; determining, by the IoT device, whether the second time-based password received from the identification device matches the first time-based password generated by the IoT device; and when the second time-based password received from the identification device matches the first time-based password, controlling, by the IoT device, the IoT based entrance to grant access to a user of the identification device.

In certain embodiments, the identification device is a mobile device storing a copy of the secret key, wherein the mobile device is configured to obtain permission for the user of the identification device by: generating the request with the wireless address of the mobile device, and sending the request to the IoT device through the wireless network to establish the secured connection with the IoT device through the wireless network; receiving, from the IoT device, a notification to establish the secured connection; in response to the notification, generating the second time-based password based on the access time and the secret key; and sending the password to the IoT device through the secured connection to obtain permission for the user of the identification device.

In certain embodiments, the mobile device is further configured to: obtain the copy of the secret key from a remote computing device through a network, wherein the network is independent and separate from the wireless network.

In certain embodiments, the wireless network is a Bluetooth network.

In certain embodiments, the method further includes: when the second time-based password received from the identification device does not match the first time-based password, controlling the IoT based entrance to deny access to the user of the identification device.

Certain aspects of the disclosure direct to a non-transitory computer readable medium storing computer executable code. In certain embodiments, the computer executable code, when executed at a processor of an IoT device for an IoT based entrance, is configured to: receive, from an identification device through a wireless network, a request to establish a secured connection, wherein the IoT device is configured to store a secret key for generating a first time-based password, and the request comprises a wireless address of the identification device; verify the wireless address of the identification device is verified, establish the secured connection with the identification device through the wireless network; receive, from the identification device through the secured connection, a second time-based password generated by the identification device; generate the first time-based password based on an access time and the secret key; determine whether the second time-based password received from the identification device matches the first time-based password generated by the IoT device; and when the second time-based password received from the identification device matches the first time-based password, control the IoT based entrance to grant access to a user of the identification device.

In certain embodiments, the identification device is a mobile device storing a copy of the secret key, wherein the mobile device is configured to obtain permission for the user of the identification device by: generating the request with the wireless address of the mobile device, and sending the request to the IoT device through the wireless network to establish the secured connection with the IoT device through the wireless network; receiving, from the IoT device, a notification to establish the secured connection; in response to the notification, generating the second time-based password based on the access time and the secret key; and sending the password to the IoT device through the secured connection to obtain permission for the user of the identification device.

In certain embodiments, the mobile device is further configured to: obtain the copy of the secret key from a remote computing device through a network, wherein the network is independent and separate from the wireless network.

In certain embodiments, the wireless network is a Bluetooth network.

In certain embodiments, the computer executable code includes: a data store storing a plurality of authenticated wireless addresses and the secret key; a wireless connection module configured to: receive the request to establish the secured connection; establish the secured connection with the identification device through the wireless network; and receive the second time-based password through the secured connection; an address filtering module configured to: retrieve the wireless address of the identification device from the request, compare the wireless address of the identification device with the authenticated wireless addresses stored in the data store, and determine that the wireless address of the identification device is verified when the wireless address of the identification device matches with one of the authenticated wireless addresses stored in the data store; a password verification module configured to: obtain a current time as the access time of the identification device, retrieve the secret key from the data store, generate the time-based one time password based on the access time and the secret key, and determine whether the password received from the identification device matches the time-based one time password generated by the IoT device; and an entrance control module configured to, when the password received from the identification device matches the time-based one time password, control the IoT based entrance to grant access to the user of the identification device.

In certain embodiments, the data store stores a plurality of secret keys, and the password verification module is configured to retrieve the secret key by selecting, from the plurality of secret keys, one of the secret keys corresponding to the identification device based on the wireless address of the identification device.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
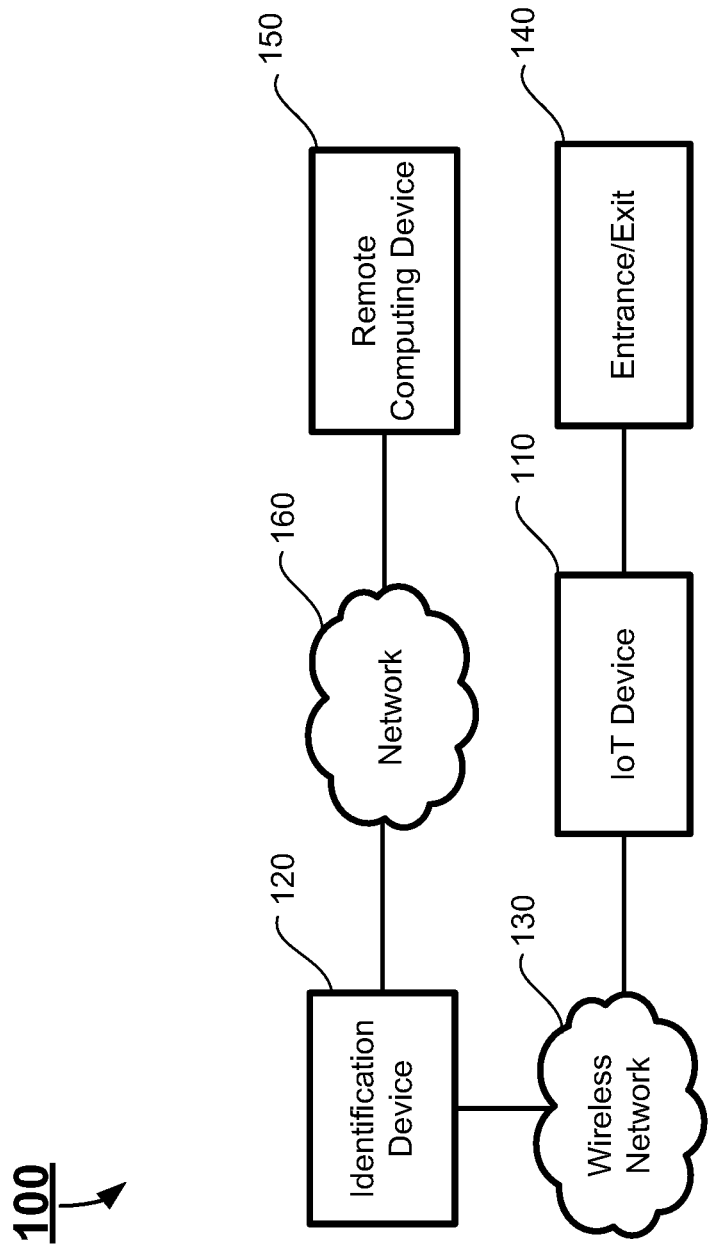
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on IoT devices. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for securing an Internet of Things (IoT) based entrance with multi-factor authentication. As discussed above, a mobile device may be used as the identification device to access an automatic entrance/exit of a secured area. In certain embodiments, the automatic entrance/exit may be an IoT entrance/exit, which has a microcontroller with Bluetooth support. The microcontroller controls the opening and closing of the entrance/exit. The mobile device of an authenticated user uses Bluetooth to connect and transmit commands to open the entrance/exit. The IoT device has a database storing allowable Bluetooth addresses, and may use the database to filter the Bluetooth address acquired from the mobile device, thus securely allowing only for authenticated users to successfully unlock the entrance/exit. However, the security is insured only by allowable Bluetooth addresses stored in the database of the IoT device. On the other hand, modifying a mobile device to spoof a Bluetooth address is easy and will compromise the security. Thus, certain embodiments of the present disclosure provide systems and methods to implement a system using IoT technology to implement multiple authentication in order to fulfill the need for securing that only authenticated personnel can unlock the entrance/exit.

FIG. 1 schematically depicts an exemplary system according to certain embodiments of the present disclosure. As shown in FIG. 1, the system 100 includes an IoT device 110, an identification device 120, an entrance/exit 140 and a remote computing device 150. The IoT device 110 and the entrance/exit 140 collectively form an IoT based entrance for a designated area, which may be an enclosed and secured area. The IoT device 110 and the identification device 120 are communicatively interconnected via a wireless network 130. In certain embodiments, the wireless network may be a Bluetooth network under the Bluetooth protocol, which enables communications between the IoT device 110 and the identification device 120 through Bluetooth connections. In certain embodiments, the wireless network may be any other wireless networks under different wireless protocols, which enable communications between the IoT device 110 and the identification device 120 through wireless connections. Further, the identification device 120 and the remote computing device 150 may be communicatively interconnected via a network 160, which may be independent and separate from the Bluetooth network 130. In certain embodiments, the network 160 may be wired or wireless network, and may be of various forms. Examples of the network 160 may include, but is not limited to, a local area network (LAN) or wide area network (WAN) including the Internet. In certain embodiments, the IoT device 110 may also be connected to the network 160. Further, additional different networks may be applied to interconnect the IoT device 110, the identification device 120 and the remote computing device 150.

The entrance/exit 140 is a movable structure that may be used to block off or allow access to a passage to enter into (or to leave from) the designated area. Generally, the designated area may be an enclosed and secured area, such as a building, an office area, a hospital, a vehicle, or any other enclosed area that a person who attempts to access to the area through the entrance/exit 140 must have permission to do so. For the person to obtain permission to access the secured area through the entrance/exit 140, the person must be an authenticated user of an identification device 120, who may pass the authentication process with the IoT device 110. In certain embodiments, the entrance/exit 140 may be implemented by a door, a gate, or any other structure with security means that may be used to block off or allow access to the secured area, with a default status of the entrance/exit 140 being a block status. For example, the entrance/exit 140 may be an automatic door which is control by the IoT device 110 to open or close, and the default status of the automatic door is closed. Alternatively, the entrance/exit 140 may be a door which is control by the IoT device 110 to be locked or unlocked, and the default status of the door is locked.

The IoT device 110 is a device with IoT functionalities, which communicates with the identification device 120 and controls the entrance/exit 140 based on authorization to the identification devices 120. In certain embodiments, the IoT device 110 may be communicatively connected to the entrance/exit 140 through an interface, which enables the IoT device 110 to transmit a control signal to the entrance/exit 140, in order to grant or deny access to the secured area through the entrance/exit 140. In certain embodiments, the IoT device 110 may be located in or on the entrance/exit 140, as a part of the entrance/exit 140, or near the entrance/exit 140.

Figure 2:
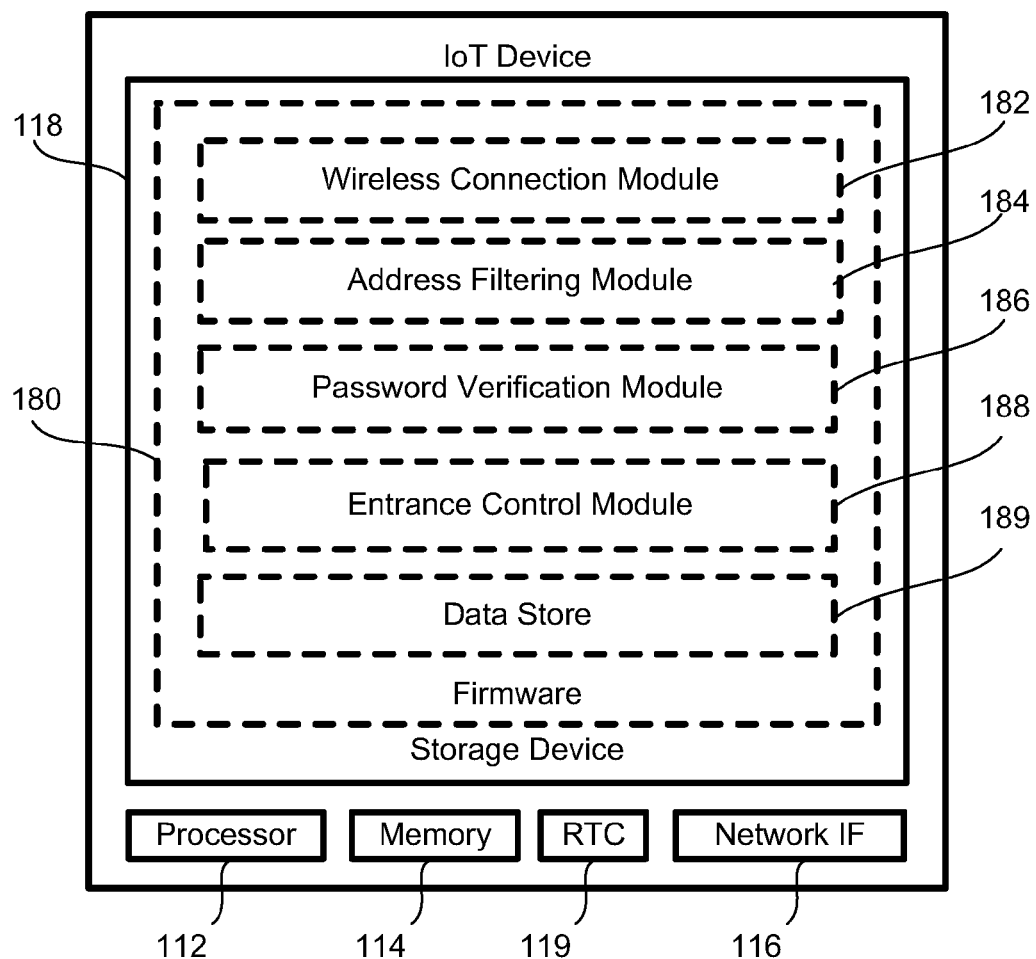
FIG. 2 schematically depicts an exemplary IoT device of the system according to certain embodiments of the present disclosure.

FIG. 2 schematically depicts an exemplary IoT device 110 of the system according to certain embodiments of the present disclosure. In certain embodiments, the IoT device 110 may include necessary hardware and software components to perform certain predetermined tasks, such as communication with the identification device 120 and controlling the entrance/exit 140. As shown in FIG. 2, the IoT device 110 includes a processor 112, a memory 114, a network interface 116, a storage device 118, and a real-time clock (RTC) 119. Further, the IoT device 110 may include other hardware components and software components (not shown) to perform its corresponding tasks. Examples of these hardware and software components may include, but not limited to, other required memory, interfaces, buses, Input/Output (I/O) modules and peripheral devices.

The processor 112 is configured to control operation of the IoT device 110. In certain embodiments, the processor 112 may be a central processing unit (CPU). The processor 112 can execute any computer executable code or instructions, such as the firmware 180 of the IoT 110 or other applications and instructions of the IoT device 110. In certain embodiments, the IoT device 110 may run on more than one processor, such as two processors, four processors, eight processors, or any suitable number of processors.

The memory 114 can be a volatile memory, such as the random-access memory (RAM), for storing the data and information during the operation of the IoT device 110. In certain embodiments, the memory 114 may be a volatile memory array. In certain embodiments, the IoT device 110 may run on more than one memory 114.

The network interface 116 is an interface that connect the IoT device 110 to the wireless network 130. For example, when the wireless network 130 is a Bluetooth network, the network interface 116 may be a Bluetooth interface, which is dedicated to connecting the IoT device 110 to the Bluetooth network. In certain embodiments, the network interface 116 may be implemented by a network interface card (NIC). It should be noted that the IoT device 110 may include two or more different network interfaces if the IoT device 110 is connected to more than one network. For example, if the IoT device 110 is connected to both the wireless network 130 and the network 160 as shown in FIG. 1, the IoT device 110 may include two different network interfaces, with one of the network interface 116 being dedicated to connecting the IoT device 110 to the wireless network 130, and the other network interface being dedicated to connecting the IoT device 110 to the network 160. In certain embodiments, the number of network interfaces of the IoT device 110 may be determined based on the networks provided by the system. In other words, when the system 100 includes additional network for the IoT device 110 to connect to, the IoT device 110 may include more network interfaces to perform network communication with the additional network.

The storage device 118 is a non-volatile data storage media for storing the applications of the IoT device 110, such as the firmware 180. Examples of the storage device 118 may include non-volatile memory such as flash memory, memory cards, USB drives, hard drives, floppy disks, optical drives, or any other types of data storage devices. In certain embodiments, the IoT device 110 may have multiple storage devices 118, which may be identical storage devices or different types of storage devices, and the firmware 180 and other applications of the IoT device 110 may be stored in one or more of the storage devices 118 of the IoT device 110.

The RTC 119 is a computer clock used to keep track of the current time. In certain embodiments, the "current time" may include only the time information, or may include both the time and date information. In certain embodiments, the RTC 119 is configured to maintain accurate time and date, and periodically communicate with remote network time protocol (NTP) servers (not shown in FIGS. 1 and 2) to synchronize the time and date maintained in the RTC 117 with the NTP servers, so as to ensure that that the time and date maintained in the RTC 117 is accurate. In certain embodiments, the RTC 119 may be implemented by an integrated circuit, which is independent from the firmware 180, such that the RTC 119 may maintain accurate current data and time without being disturbed by the operation of the IoT device 110. Alternatively, in certain embodiments, the RTC 119 may be implemented by a combination of hardware and software components of the IoT device 110. For example, the RTC 119 may be a module of the firmware 180 which is stored in the storage device 118.

The firmware 180 of the IoT device 110 may include a plurality of firmware modules, which may be implemented by computer executable codes or instructions to collectively form the firmware 180. As shown in FIG. 2, the firmware 180 includes, among other things, a wireless connection module 182, an address filtering module 184, a password verification module 186, an entrance control module 188, and a data store 189. In certain embodiments, the firmware 180 may include other applications necessary for the operation of the IoT device 110. In certain embodiments, each of the modules may further include sub-modules. Alternatively, some or all of the modules may be combined as one module.

The wireless connection module 182 controls the communication through the network interface 116 dedicated to the wireless network 130. For example, when the wireless network 130 is a Bluetooth network, the wireless connection module 182 may be a module under the Bluetooth protocol to control the network interface 116 to communicate with the Bluetooth network. In certain embodiments, when the IoT device 110 receives a signal through the wireless network 130, the wireless connection module 182 receives the signal and sends the signal to a corresponding module to process the signal. In certain embodiments, when the wireless connection module 182 receives a command from a module to send out a signal through the wireless network 130, the wireless connection module 182 constructs the signal based on the command and sends out the signal to the wireless network 130 through the network interface 116.

The address filtering module 184 is configured to perform the wireless address verification or filtering process, which is a first step of an authentication process. Specifically, the authentication process may include multiple factors, and the wireless address verification or filtering process function as a first (and necessary) step of the multi-factored authentication process. In certain embodiments, when the wireless connection module 182 receives a communication signal from the identification device 120 through the wireless network 130 as a request for establishing a secured connection, the request may include a wireless address of the identification device 120. In certain embodiments, the wireless address of the identification device 120 may be a Bluetooth address. In this case, the address filtering module 184 processes the communication signal (i.e., the request) to retrieve the wireless address of the identification device 120 from the request, and determine if the retrieved wireless address of the identification device 120 corresponds to any wireless address of authenticated identification devices stored in the data store 189. In certain embodiments, the address filtering module 184 compares the wireless address of the identification device 120 retrieved from the communication signal with all of the wireless addresses stored in the data store 189. If the wireless address of the identification device 120 matches one of the wireless addresses stored in the data store 189, the address filtering module 184 determines that the identification device 120 passes the address verification or filtering process (i.e., the first step of authentication). Alternatively, if the wireless address of the identification device 120 does not match any of the wireless addresses stored in the data store 189, the address filtering module 184 determines that the identification device 120 does not pass the address verification or filtering process, and the identification device 120 is thus not authenticated. Once the address filtering module 184 determines that the identification device 120 passes the address verification or filtering process, the address filtering module 184 may instruct the wireless connection module 182 to establish a secure connection between IoT device 110 and the identification device 120.

The password verification module 186 is configured to perform one or more password verification processes. Specifically, the password verification processes may include a time-based one time password verification process, which is a second step of the multi-factored authentication process, and an optional regular account/password authentication process, which is a third step of the multi-factored authentication process. The sequence of the password verification processes may be subject to change. In other words, the time-based one time password verification process may be performed before or after the regular account/password authentication process. In certain embodiments, the password verification processes may include only the time-based one time password verification process as a second step of the multi-factored authentication process, In certain embodiments, to perform the time-based one time password verification process, the password verification module 186 may obtain the current time from the RTC 119 as an access time for the identification device 120. Since the time and date maintained in the RTC 117 may be synchronized with the NTP servers, the current time obtained by the password verification module 186 from the RTC 119 should be synchronized with the identification device 120. The password verification module 186 may also retrieve a secret key from the data store 189. Based on the current time and the secret key, the password verification module 186 may generate a time-based password, which is used one time only. Then the password verification module 186 may compare the time-based password generated with the password received from the identification device 120, and determine if the identification device 120 passes the time-based one time password verification process. If the password received from the identification device 120 matches the time-based password generated, the password verification module 186 may determine that the identification device 120 passes the time-based one time password verification process (i.e., the second step of the authentication process). Alternatively, if the password received from the identification device 120 does not match the time-based password generated, the password verification module 186 may determine that the identification device 120 is not authenticated.

Further optionally, in certain embodiments, to perform the regular account/password authentication process, the password verification module 186 may receive a set of authentication information, such as an account and corresponding password, from the identification device 120, and compare the authentication information to the authentication data stored in the data store 189. If the authentication information received from the identification device 120 matches one of the authentication data stored in the data store 189, the password verification module 186 may determine that the identification device 120 passes the regular account/password authentication process (i.e., the third step of the authentication process). Alternatively, if the authentication information received from the identification device 120 does not match any of the authentication data stored in the data store 189, the password verification module 186 may determine that the identification device 120 is not authenticated.

The entrance control module 188 is a module to control the entrance/exit 140. As discussed above, the entrance/exit 140 may be implemented by a door, a gate, or any other structure with security means that may be used to block off or allow access to the secured area, with a default status of the entrance/exit 140 being a block status. When the address filtering module 184 and the password verification module 186 respectively perform the multiple steps of the authentication process and determines that the identification device 120 is authenticated, the entrance control module 188 may send a control signal to the entrance/exit 140 to unblock the entrance/exit 140, such as opening or unlocking the entrance/exit 140, in order to grant access to the user of the identification device 120 to enter (or to leave from) the secured area through the entrance/exit 140. For example, the entrance control module 188 may control a servo motor or any other driving device of the entrance/exit 140, which enables the opening and/or closing of the entrance/exit 140. In certain embodiments, the access being granted to the user of the identification device 120 will last for a certain period of time to allow the authenticated user to enter (or to leave from) the secured area through the entrance/exit 140. Once the period of time is up, the entrance control module 188 may send a control signal to the entrance/exit 140 to block the entrance/exit 140, such that the entrance/exit 140 returns to the default block status.

The data store 189 is a database which stores the data for the authentication process and other necessary data of the firmware 180. In certain embodiments, the data stored in the data store 189 may include, without being limited to, the authenticated wireless addresses of a number of authenticated identification devices; the secret key (or secret keys) used to generate the time-based password; and the authentication data for the authenticated identification devices. In certain embodiments, each of the authenticated wireless addresses of the authenticated identification devices may be a Bluetooth address of the identification device 120. It should be noted that, although the data store 189 is illustrated in FIG. 2 as a single block, the actual data stored in the data store 189 may be distributed in different locations of the storage device 118. In certain embodiments, when the IoT device 110 includes multiple storage devices 118, the actual data stored in the data store 189 may be distributed among the multiple storage devices 118. In certain embodiments, the data stored in the data store 189 may include other information, such as administrative information, a log for all successful and failed attempts to access the entrance/exit 140, and other information necessary for the operation of the IoT device 120.

In certain embodiments, the operation of the IoT device 110 may be described in details as below. When the wireless connection module 182 of the IoT device 110 receives a communication signal from an identification device 120 through the wireless network 130, the communication signal may be a request for establishing a secured connection, a time-based password, or authentication information (e.g., account and corresponding password) for the identification device 120. As discussed above, the time-based password and/or the authentication information (e.g., account and corresponding password) for the identification device 120 will be sent to the IoT device 110 through the secured connection. Thus, when the wireless connection module 182 receives a communication signal from the identification device 120 that is not through a secured connection, the wireless connection module 182 may determine that the communication signal includes a request for establishing a secured connection, and may then send the request to the address filtering module 184 to perform the wireless address verification or filtering process. On the other hand, when the wireless connection module 182 receives a communication signal from the identification device 120 through a secured connection, the wireless connection module 182 may determine that the communication signal includes either a time-based password or the authentication information (e.g., account and corresponding password) for the identification device 120, and may then send the communication signal to the password verification module 186 to perform the corresponding password verification processes.

When the address filtering module 184 receives the request to establish a secured connection, the address filtering module 184 performs the wireless address verification or filtering process based on the wireless address included in the request. In this case, the address filtering module 184 processes the request to retrieve the wireless address of the identification device 120 from the request, and determine if the retrieved wireless address of the identification device 120 corresponds to any of the authenticated wireless addresses stored in the data store 189. If the wireless address of the identification device 120 does not match any of the authenticated wireless addresses stored in the data store 189, the address filtering module 184 determines that the identification device 120 does not pass the address verification or filtering process, and the identification device 120 is thus not authenticated. Thus, no secured connection will be established. On the other hand, if the wireless address of the identification device 120 matches one of the authenticated wireless addresses stored in the data store 189, the address filtering module 184 determines that the identification device 120 passes the address verification or filtering process (i.e., the first step of authentication), and instructs the wireless connection module 182 to establish a secure connection between IoT device 110 and the identification device 120. In response to the instruction, the wireless connection module 182 may establish a secured connection channel through the wireless network 130 for the identification device 120, and send a notification to the identification device 120 to inform the identification device 120 that the secured connection is established.

Further, when the password verification module 186 receives a time-based password (hereinafter the second time-based password) from the identification device 120, the password verification module 186 may obtain the current time from the RTC 119 as the access time for the identification device 120, and retrieve the corresponding secret key from the data store 189. Based on the current time and the secret key, the password verification module 186 may generate a time-based password (hereinafter the first time-based password). Then the password verification module 186 may compare the first time-based password (generated by the IoT device 110) with the second time-based password (received from the identification device 120). If the password received from the identification device 120 does not match the time-based password generated, the password verification module 186 may determine that the identification device 120 is not authenticated. At this point, the password verification module 186 may instruct the wireless connection module 182 to close the secured connection to the identification device 120. On the other hand, if the password received from the identification device 120 matches the time-based password generated, the password verification module 186 may determine that the identification device 120 passes the time-based one time password verification process (i.e., the second step of the authentication process).

Optionally, when the password verification module 186 receives the authentication information from the identification device 120 for the regular account/password authentication process, the password verification module 186 may compare the authentication information to the authentication data stored in the data store 189. If the authentication information received from the identification device 120 does not match any of the authentication data stored in the data store 189, the password verification module 186 may determine that the identification device 120 is not authenticated. At this point, the password verification module 186 may instruct the wireless connection module 182 to close the secured connection to the identification device 120. On the other hand, if the authentication information received from the identification device 120 matches one of the authentication data stored in the data store 189, the password verification module 186 may determine that the identification device 120 passes the regular account/password authentication process (i.e., the third step of the authentication process).

Once the password verification module 186 determines that the identification device 120 passes all of the password verification processes, the entrance control module 188 may send a control signal to the entrance/exit 140 to unblock the entrance/exit 140, such as opening or unlocking the entrance/exit 140, in order to grant access to the user of the identification device 120 to enter (or to leave from) the secured area through the entrance/exit 140.

It should be particularly noted that the secret key is used to generate the time-based password. In certain embodiments, only one secret key is provided for all authenticated users. In certain embodiments, multiple secret keys may be provided, and one or more additional security mechanisms for choosing the secret keys being used may be further imposed to increase the security of the system. For example, in certain embodiments, different identification devices 120 corresponding to different users may be associated with different secret keys for the same entrance/exit. In one exemplary embodiment, the authenticated users may be categorized in groups, and multiple secret keys may be provided for different group of authenticated users, with each group having a corresponding different secret key. In this case, the data store 189 may further include corresponding information of the secret key (or secret keys) being used for each group of authenticated users. In certain embodiments, the corresponding information of the secret key may be information relating the different secret keys to different authenticated wireless addresses. Thus, when the password verification module 186 retrieves the secret key, the password verification module 186 may select, from plurality of secret keys, one of the secret keys corresponding to the identification device 120 based on the wireless address of the identification device 120. In certain embodiments, multiple secret keys may be provided as time-based secret keys, with each secret key being designated for a specific time period. For example, for a system 100 being used in an office building, two different secret keys may be used for the weekdays and the weekends respectively, such that one secret key functions as a regular secret key during the weekdays where all employees will be present in the office, and the other secret key functions as an privileged secret key solely for the weekend. In this case, the privileged secret key may be provided solely for privileged persons in the office who may need to be present in the office during the weekend. Other additional security mechanisms for selecting or choosing the secret keys being used may be further imposed to increase the security of the system.

The identification device 120 is a device used by its corresponding user (i.e., a person) for authentication purposes. Specifically, when a person has the permission to access the designated secured area through the entrance/exit 140, the person is an authenticated user, and the identification device 120 may function to identify the person to be granted access to the secured area through the entrance/exit 140 by the authentication process. In certain embodiments, when multiple authenticated users are allowed to access the secured area, the system 100 may include a plurality of identification devices 120, and each authenticated user may have a unique corresponding identification device 120 to identify its corresponding user. In certain embodiments, the identification device 120 is a mobile device, such as a smartphone, a tablet, or any other type of mobile device that has wireless (e.g. Bluetooth) communication capabilities to enable communication with the IoT device 110. In certain embodiments, the identification device 120 may be located within a range of the IoT device 110 such that the communication with the IoT device 110 through the wireless network 130 may be established.

Figure 3:
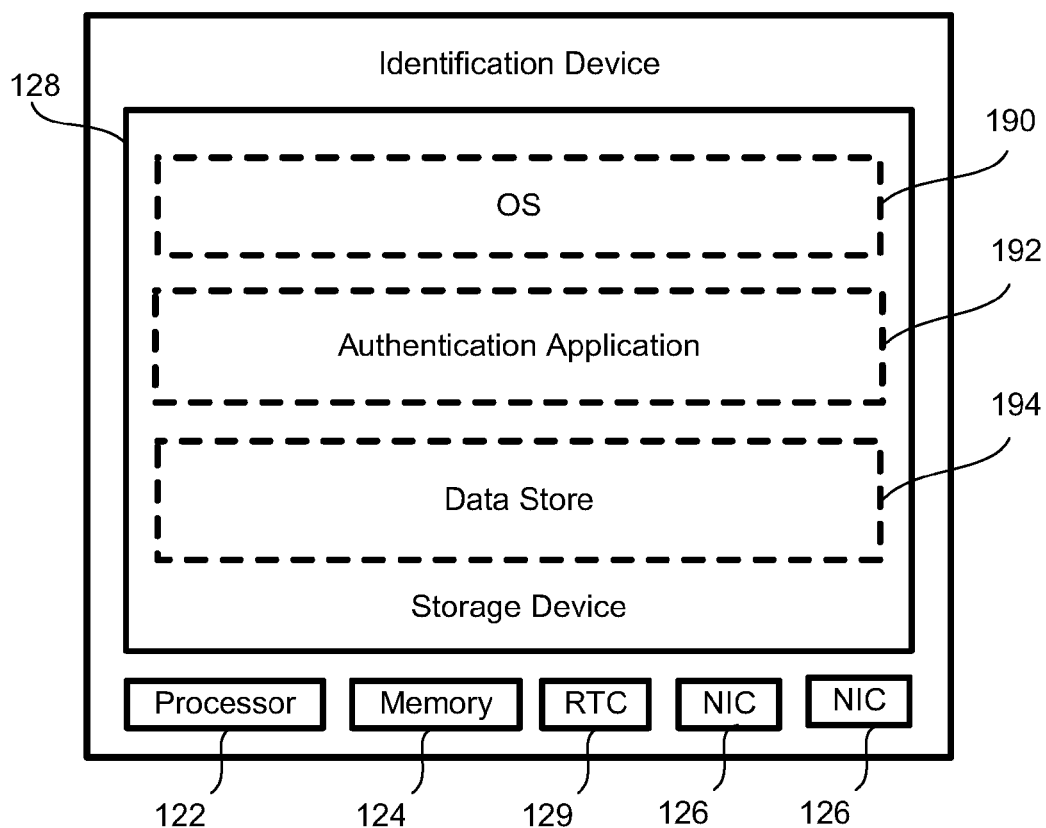
FIG. 3 schematically depicts an exemplary identification device 120 of the system according to certain embodiments of the present disclosure.

FIG. 3 schematically depicts an exemplary identification device 120 of the system according to certain embodiments of the present disclosure. In certain embodiments, the identification device 120 is a mobile device, which includes necessary hardware and software components to perform certain predetermined tasks, such as communications with the IoT device 110 and the remote computing device 150. As shown in FIG. 3, the identification device 120 includes a processor 122, a memory 124, two NICs 126, a storage device 128, and a RTC 129. The functionalities of the processor 122, the memory 124, the storage device 128 and the RTC 129 are similar to the corresponding components of the IoT device, and details of these components are not further elaborated herein. Further, the identification device 120 may include other hardware components and software components (not shown) to perform its corresponding tasks. Examples of these hardware and software components may include, but not limited to, other required memory, interfaces, buses, Input/Output (I/O) modules and peripheral devices.

The two NICs 126 of the identification device 120 includes a first network interface dedicated to connecting the identification device 120 to the wireless network 130, and a second NIC dedicated to connecting the identification device 120 to the network 160. For example, when the wireless network 130 is the Bluetooth network, the network interface dedicated to connecting the identification device 120 to the wireless network 130 may be a Bluetooth interface, and the other NIC 126 is not a Bluetooth interface.

As shown in FIG. 3, the storage device 128 of the identification device 120 may store the applications and data of the identification device 120, which includes, among other things, the operating system (OS) 190, an authentication application 192, and a data store 194. In certain embodiments, the storage device 128 of the identification device 120 may further store other applications or modules necessary for the operation of the identification device 120. In certain embodiments, the OS 190, the authentication application 192 and the data store 194 may each be implemented by computer executable codes or instructions, and may further include sub-modules or be combined as one software module.

The OS 190 is a collective management software application managing the operation of the identification device 120. For example, the OS 190 can include a set of functional programs that control and manage operations of the identification device 120. The set of application programs provide certain utility software for the user to manage the identification device 120. In certain embodiments, the OS 190 is operable to multitask, i.e., execute computing tasks in multiple threads. Examples of the OS may be any of the commercial operating systems. For example, when the identification device 120 is a mobile device, the OS may be iOS, Android, Microsoft Windows 8, Blackberry OS, or any other mobile operating systems for the mobile device.

The data store 194 is a database which stores the data for the authentication process and other necessary data of the identification device 120. In certain embodiments, the data stored in the data store 194 may include, without being limited to, the wireless address of the identification device 120, a copy of the secret key (or secret keys) used to generate the time-based password, and the authentication information (i.e., account and password) for the authenticated user of the identification device 120. In certain embodiments, the wireless address of the identification device 120 may be a Bluetooth address, which is unique and specifically correspondent to the identification device 120. In other words, when the system 100 includes multiple identification devices 120, each of the identification devices 120 will have its own unique wireless address.

The authentication application 192 is an application module to perform the authentication process by communicating with the IoT device 110 through the wireless network 130. In certain embodiments, the authentication application 192 may include a user interface for its corresponding user to input data, such as the authentication information (i.e., account and password) for the authenticated user of the identification device 120.

In operation, the authentication application 192 may retrieve the wireless address of the identification device 120 and generate a request with the wireless address of the identification device 120, and then send the request to the IoT device 110 through the wireless network 130 in order to establish a secured connection with the IoT device 110 through the wireless network 130. After sending out the request, the authentication application 192 waits for a notification from the IoT device 110 to confirm the establishment of the secured connection. Since the wireless address of the identification device 120 should match one of the wireless addresses stored in the data store 189 of the IoT device 110, the IoT device 110 will return a notification to confirm the establishment of the secured connection. Once the secured connection is established, the authentication application 192 may generate a time-based password based on the access time and the secret key. Since the secret key should be identical to the secret key (or a corresponding one of the secret keys) stored in the data store 189 of the IoT device 110, the time-based password generated by the authentication application 192 should be identical to the time-based password generated by the password verification module 186 of the IoT device 110. the authentication application 192 may then send the time-based password generated, as well as the authentication information (i.e., account and password for the optional regular account/password authentication process), to the IoT device 110 for authentication. Once the IoT device 110 completes the authentication process, the user (i.e., the holder of the identification device 120) will be successfully authenticated, and will be granted access to the entrance/exit 140.

Specifically, when the identification device 120 is an authenticated identification device 120, the data for authentication purposes in the data store 194 should all match the data stored in the IoT device 110. In other words, the wireless address of the identification device 120 should match one of the wireless addresses stored in the data store 189 of the IoT device 110, the authentication information should match one of the authentication data stored in the data store 189 of the IoT device 110, and the secret key should be identical to the secret key (or a corresponding one of the secret keys) stored in the data store 189 of the IoT device 110. In comparison, if the identification device 120 is not an authenticated identification device 120, the data for authentication purposes in the data store 194 may not match the corresponding data stored in the IoT device 110. In this case, the multiple factors being used in the authentication process, including the wireless address, the secret key for generating the time-based password, and the authentication information, may greatly increase the difficulty for a person without permission to spoof the identification device 120 in order to compromise the security. For example, a person without permission may successfully modify a mobile device to spoof a Bluetooth address of an authenticated mobile device and obtain the authentication information (i.e., account and password) of an authenticated user, but it will be difficult for the person to obtain the secret key for generating the time-based password.

The remote computing device 150 is a computing device which may be communicatively connected to the identification device 120 through the network 160. In certain embodiments, the remote computing device 150 functions as a server, which may provide necessary application and/or data for the identification device 120. For example, the remote computing device 150 may include a copy of the authentication application 192 and a secret key, and an authenticated user may use its identification device 120 to download the authentication application 192 and/or the secret key from the remote computing device 150 through the network 160.

Optionally, in certain embodiments, when the IoT device 110 is also connected to the network 160, the remote computing device 150 may also provide necessary application and/or data for the IoT device 120, or function as a computer for the administrator to access the IoT device 110 in order to monitor the information of the IoT device 110. For example, in certain embodiments, the remote computing device 150 may send data such as the secret key (or secret keys), the authenticated wireless addresses and/or the authentication data corresponding to the authenticated identification devices 120 to the IoT device 110 through the network 160 to update the data stored in the data store 189 of the IoT device 110. In certain embodiments, the administrator may remotely access the IoT device 110 from the remote computing device 150 to monitor the accessibility of the entrance/exit 140, such as the details of successful attempts to access the entrance/exit 140 using authenticated identification devices 120 and/or failed attempts to access the entrance/exit 140 using unauthenticated devices. Moreover, in certain embodiments, the secret key (or secret keys) may be generated randomly by a random secret key generator, which may be located in the remote computing device 150 or any other secured location of the system 100. Specifically, the administrator of the system 100 may use the remote computing device 150 to randomly generate one or more secret keys through the random secret key generator, so as to respectively update the secret key information stored in the IoT device 110 and the identification device 120. In certain embodiments, the administrator of the system 100 may use the remote computing device 150 to manage the information of the identification device 120 and the IoT device 110, to remotely control the accessibility of the entrance/exit 140, and/or to update information stored in the identification device 120 and in the IoT device 110.

In certain embodiments, in order to generate the time-based one time password using the secret key, the secret key may include a cryptographic algorithm to convert the access time into a series of characters, numbers, symbols, or combinations thereof. Specifically, the cryptographic algorithm may be a function that maps an input message (i.e., the access time) onto a ciphertext (the encrypted password). For example, a simple (and thus not very secured) technique of the cryptographic algorithm may be replacing every digit of the access time with a corresponding alphabet in the same sequential order (1 to A, 2 to B, 3 to C . . . 9 to I, and 0 to J). In this case, an access time of 09:25:35 may be converted to a string of JIBECE. Typically, other more complicated techniques of the cryptographic algorithm may be used as the secret key. Popular cryptographic algorithms such as DES, 3-DES, IDEA, Blowfish and the Advanced Encryption Standard (AES) may be adopted as the secret key.

In certain embodiments, in order to successfully authenticate the identification device 120 using the time-based one time password verification process, time synchronization must be ensured for the identification device 120 and the IoT device 110. Since the identification device 120 may be located within a range of the IoT device 110 such that the communication with the IoT device 110 through the wireless network 130 may be established, the data transmission through the wireless network 130 should be fast enough that the access time for the identification device 120 and the access time for the IoT device 110 may be synchronized. In other words, the data transmission between the identification device 120 and the IoT device 110 does not need to include time information. In certain embodiments, to further ensure time synchronization is guaranteed between the identification device 120 and the IoT device 110, data transmission between the identification device 120 and the IoT device 110 may include time information. In certain embodiments, the administrator may monitor and review information of the access time of the identification device 120 and/or the IoT device 110 through the remote computing device 150 if errors occur in the time-based one time password verification process.

As discussed above, the system 100 provides a multi-factor authentication process, which includes a wireless address verification or filtering process, a time-based one time password verification process, and an optional regular account/password authentication process. In certain embodiments, additional authentication or verification mechanisms may be added in the multi-factor authentication process to increase the complexity of the security measurements of the system 100. For example, one or more of the steps in the multi-factor authentication process may be time-based, such that the user of the identification device 120 is only granted access to the designated secured area within a specific time range. In one exemplary embodiment, the IoT device 110 for a specific entrance/exit 140 may be preset such that all access through the entrance/exit 140 will be granted only within a certain time period, such as 9:00 a.m. to 3:00 p.m for each day. In other words, the authentication process will only be performed out of the time period of 9:00 a.m. to 3:00 p.m for each day. In this case, the modules of the IoT device 110 (such as the address filtering module 184 and/or the password verification module 186) may be de-activated during the time period of 9:00 a.m. to 3:00 p.m for each day. At a time out of the time period of 9:00 a.m. to 3:00 p.m for each day (e.g., 4:30 p.m.), the modules of the IoT device 110 may be activated such that any attempts to access the secured area through the entrance/exit 140 will be subject to the authentication process as described above. In another exemplary embodiment, the IoT device 110 for a specific entrance/exit 140 may be preset such that all access through the entrance/exit 140 will be denied only within a certain time period, such as 0:30 a.m. to 6:00 a.m for each day. In other words, the authentication process will be performed regularly out of the time period of 0:30 a.m. to 6:00 a.m for each day. In this case, the modules of the IoT device 110 (such as the address filtering module 184 and/or the password verification module 186) may be activated only out of the time period of 0:30 a.m. to 6:00 a.m. for each day. At a time during of the time period of 0:30 a.m. to 6:00 a.m for each day (e.g., 2:30 a.m.), the modules of the IoT device 110 may be set to a denial mode such that all attempts to access the secured area through the entrance/exit 140 will be denied.

In certain embodiments, a designated secured area may include more than one entrance/exit 140, and each entrance/exit 140 may be provided with a corresponding IoT device 110 such that the identification device 120 may be used to perform the multi-factor authentication process with any of the IoT devices 110 to enter the designated secured area. In certain embodiments, each entrance/exit 140 may be granted with a different level of accessibility, and different secret keys may be used for the corresponding IoT devices 110 such that the time-based password generated by each IoT device 110 may be different.

Figure 4:
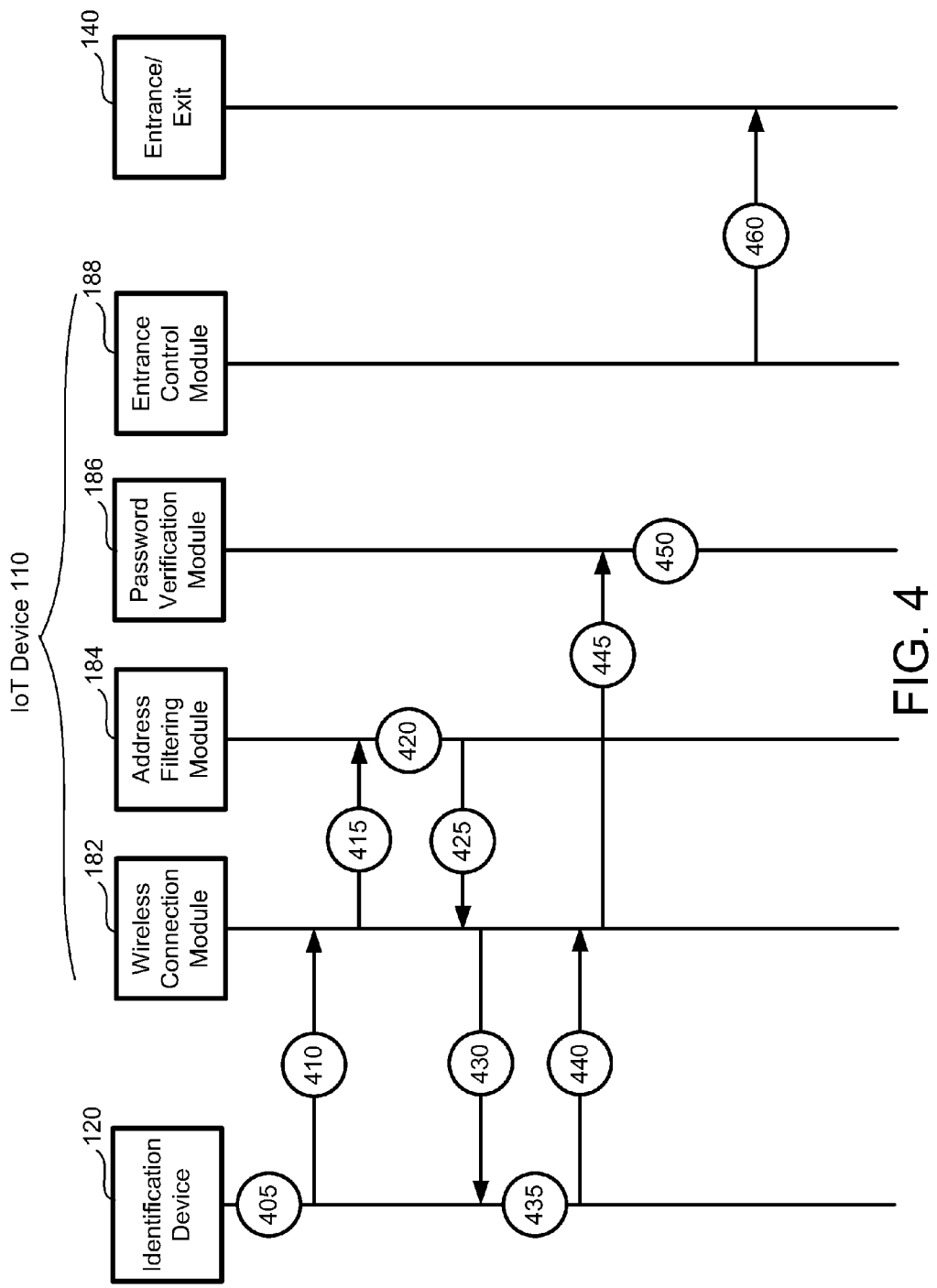
FIG. 4 depicts a flowchart showing a method for securing IoT based entrance/exit with multi-factor authentication according to certain embodiments of the present disclosure.

A further aspect of the present disclosure is directed to a method for securing IoT based entrance/exit with multi-factor authentication. FIG. 4 depicts a flowchart showing a method for securing IoT based entrance/exit with multi-factor authentication according to certain embodiments of the present disclosure. In certain embodiments, the method as shown in FIG. 4 may be implemented on a system as shown in FIG. 1. It should be particularly noted that, unless otherwise stated in the present disclosure, the steps of the method may be arranged in a different sequential order, and are thus not limited to the sequential order as shown in the flowchart.

As shown in FIG. 4, at procedure 405, the authentication application 192 of the identification device 120 may retrieve the wireless address of the identification device 120 and generate a request with the wireless address of the identification device 120. In certain embodiments, the generation of the request may be automatic. Alternatively, in certain embodiments, the generation of the request may be in response to a command obtained from the user input through the user interface of the identification device 120. At procedure 410, the identification device 120 sends the request to the IoT device 110 through the wireless network 130 in order to establish a secured connection with the IoT device 110 through the wireless network 130. After sending out the request, the authentication application 192 waits for a notification from the IoT device 110 to confirm the establishment of the secured connection.

At the IoT device 110, when the wireless connection module 182 of the IoT device 110 receives the request from the identification device 120 through the wireless network 130, the wireless connection module 182 recognizes the request since no secured connection has been established between the IoT device 110 and the identification device 120. Thus, at procedure 415, the wireless connection module 182 sends the request to the address filtering module 184 to perform the wireless address verification or filtering process.

At procedure 420, when the address filtering module 184 receives the request to establish a secured connection, the address filtering module 184 performs the wireless address verification or filtering process based on the wireless address included in the request by processing the request to retrieve the wireless address of the identification device 120 from the request, and determining if the retrieved wireless address of the identification device 120 corresponds to any of the authenticated wireless addresses stored in the data store 189. If the wireless address of the identification device 120 does not match any of the authenticated wireless addresses stored in the data store 189, the address filtering module 184 determines that the identification device 120 does not pass the address verification or filtering process, and the identification device 120 is thus not authenticated. Thus, the authentication process will stop at procedure 420, and no secured connection will be established. On the other hand, if the wireless address of the identification device 120 matches one of the authenticated wireless addresses stored in the data store 189, the address filtering module 184 determines that the identification device 120 passes the address verification or filtering process (i.e., the first step of authentication). Thus, at procedure 425, the address filtering module 184 instructs the wireless connection module 182 to establish a secure connection between IoT device 110 and the identification device 120. At procedure 430, in response to the instruction, the wireless connection module 182 establishes a secured connection channel through the wireless network 130 for the identification device 120, and sends a notification to the identification device 120 to inform the identification device 120 that the secured connection is established.

At the identification device 120, once the notification is received that the secured connection is established, at procedure 435, the authentication application 192 of the identification device 120 may generate the second time-based password based on the access time and the secret key. At procedure 440, the identification device 120 may send the second time-based password to the IoT device 110 through the secured connection. Optionally, the identification device 120 may simultaneously send the authentication information (i.e., account and password for the optional regular account/password authentication process) to the IoT device 110 at procedure 440. It should be particularly noted that the second time-based password and the authentication information may be sent independently and separately.

At procedure 445, when the wireless connection module 182 receives the password (the second time-based password and/or the authentication information) from the identification device 120 through a secured connection, the wireless connection module 182 sends the communication signal to the password verification module 186 to perform the corresponding password verification processes. At procedure 450, the password verification module 186 to perform the corresponding password verification processes as described above. Specifically, when the password verification module 186 receives the second time-based password from the identification device 120, the password verification module 186 may obtain the current time from the RTC 119 as the access time for the identification device 120, and retrieve the corresponding secret key from the data store 189. Based on the current time and the secret key, the password verification module 186 may generate a time-based password (hereinafter the first time-based password). Then the password verification module 186 may compare the first time-based password (generated by the IoT device 110) with the second time-based password (received from the identification device 120). If the password received from the identification device 120 does not match the time-based password generated, the password verification module 186 may determine that the identification device 120 is not authenticated. At this point, the password verification module 186 may instruct the wireless connection module 182 to close the secured connection to the identification device 120. On the other hand, if the password received from the identification device 120 matches the time-based password generated, the password verification module 186 may determine that the identification device 120 passes the time-based one time password verification process (i.e., the second step of the authentication process). Optionally, when the password verification module 186 receives the authentication information from the identification device 120 for the regular account/password authentication process, the password verification module 186 may compare the authentication information to the authentication data stored in the data store 189. If the authentication information received from the identification device 120 does not match any of the authentication data stored in the data store 189, the password verification module 186 may determine that the identification device 120 is not authenticated. At this point, the password verification module 186 may instruct the wireless connection module 182 to close the secured connection to the identification device 120. On the other hand, if the authentication information received from the identification device 120 matches one of the authentication data stored in the data store 189, the password verification module 186 may determine that the identification device 120 passes the regular account/password authentication process (i.e., the third step of the authentication process).

Once the password verification module 186 determines that the identification device 120 passes all of the password verification processes, the password verification module 186 notifies the entrance control module 188. At procedure 460, the entrance control module 188 may send a control signal to the entrance/exit 140 to unblock the entrance/exit 140, such as opening or unlocking the entrance/exit 140, in order to grant access to the user of the identification device 120 to enter (or to leave from) the secured area through the entrance/exit 140.

In a further aspect, the present disclosure is related to a non-transitory computer readable medium storing computer executable code. The code, when executed at one or more processer, may perform the method as described above. In certain embodiments, the non-transitory computer readable medium may include, but not limited to, any physical or virtual storage media. In certain embodiments, the non-transitory computer readable medium may be implemented as the storage device 118 of the IoT device 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   at least one internet of things (IoT) based entrance for a designated area, each of the at least one IoT based entrance comprising an IoT device, the IoT device comprising a processor and a storage device storing computer executable code and a secret key for generating a first time-based password, wherein the computer executable code, when executed at the processor, is configured to:
   receive, from an identification device through a wireless network, a request to establish a secured connection, wherein the request comprises a wireless address of the identification device;
   verify the wireless address of the identification device;
   when the wireless address of the identification device is verified, establish the secured connection with the identification device through the wireless network;
   receive, from the identification device through the secured connection, a second time-based password generated by the identification device;
   generate the first time-based password based on an access time and the secret key;
   determine whether the second time-based password received from the identification device matches the first time-based password generated by the IoT device; and
   when the second time-based password received from the identification device matches the first time-based password, control the IoT based entrance to grant access to a user of the identification device.

2. The system as claimed in claim 1, wherein the identification device is a mobile device storing a copy of the secret key, wherein the mobile device is configured to obtain permission for the user of the identification device by:
   generating the request with the wireless address of the mobile device, and sending the request to the IoT device through the wireless network to establish the secured connection with the IoT device through the wireless network;
   receiving, from the IoT device, a notification to establish the secured connection;
   in response to the notification, generating the second time-based password based on the access time and the secret key; and
   sending the password to the IoT device through the secured connection to obtain permission for the user of the identification device.

3. The system as claimed in claim 2, wherein the mobile device is further configured to:
   obtain the copy of the secret key from a remote computing device through a network, wherein the network is independent and separate from the wireless network.

4. The system as claimed in claim 3, wherein the remote computing device comprises a random secret key generator to generate the secret key.

5. The system as claimed in claim 1, wherein the wireless network is a Bluetooth network.

6. The system as claimed in claim 1, wherein each of the at least one IoT based entrance comprises a door controlled by the IoT device, and the IoT device is configured to control the IoT based entrance to grant access to the user of the identification device by opening or unlocking the door.

7. The system as claimed in claim 1, wherein the computer executable code is further configured to, when the second time-based password received from the identification device does not match the first time-based password, control the IoT based entrance to deny access to the user of the identification device.

8. The system as claimed in claim 1, wherein the computer executable code comprises:
   a data store storing a plurality of authenticated wireless addresses and the secret key;
   a wireless connection module configured to:
   receive the request to establish the secured connection;
   establish the secured connection with the identification device through the wireless network; and
   receive the second time-based password through the secured connection;
   an address filtering module configured to:
   retrieve the wireless address of the identification device from the request,
   compare the wireless address of the identification device with the authenticated wireless addresses stored in the data store, and
   determine that the wireless address of the identification device is verified when the wireless address of the identification device matches with one of the authenticated wireless addresses stored in the data store;
   a password verification module configured to:

obtain a current time as the access time of the identification device, retrieve the secret key from the data store, generate the time-based one time password based on the access time and the secret key, and determine whether the password received from the identification device matches the time-based one time password generated by the IoT device; and an entrance control module configured to, when the password received from the identification device matches the time-based one time password, control the IoT based entrance to grant access to the user of the identification device.

9. The system as claimed in claim 8, wherein the data store stores a plurality of secret keys, and the password verification module is configured to retrieve the secret key by selecting, from the plurality of secret keys, one of the secret keys corresponding to the identification device based on the wireless address of the identification device.

10. A method for securing an internet of things (IoT) based entrance for a designated area with multi-factor authentication, the method comprising:

receiving, at an IoT device of the IoT based entrance, a request to establish a secured connection from an identification device through a wireless network, wherein the IoT device is configured to store a secret key for generating a first time-based password, and the request comprises a wireless address of the identification device;

verifying, by the IoT device, the wireless address of the identification device;

when the wireless address of the identification device is verified, establishing, by the IoT device, the secured connection with the identification device through the wireless network;

receiving, by the IoT device, a second time-based password generated by the identification device from the identification device through the secured connection;

generating, by the IoT device, the first time-based password based on an access time and the secret key;

determining, by the IoT device, whether the second time-based password received from the identification device matches the first time-based password generated by the IoT device; and when the second time-based password received from the identification device matches the first time-based password, controlling, by the IoT device, the IoT based entrance to grant access to a user of the identification device.

11. The method as claimed in claim 10, wherein the identification device is a mobile device storing a copy of the secret key, wherein the mobile device is configured to obtain permission for the user of the identification device by:

generating the request with the wireless address of the mobile device, and sending the request to the IoT device through the wireless network to establish the secured connection with the IoT device through the wireless network;

receiving, from the IoT device, a notification to establish the secured connection;

in response to the notification, generating the second time-based password based on the access time and the secret key; and sending the password to the IoT device through the secured connection to obtain permission for the user of the identification device.

12. The method as claimed in claim 11, wherein the mobile device is further configured to:

obtain the copy of the secret key from a remote computing device through a network, wherein the network is independent and separate from the wireless network.

13. The method as claimed in claim 11, wherein the wireless network is a Bluetooth network.

14. The method as claimed in claim 10, further comprising:

when the second time-based password received from the identification device does not match the first time-based password, controlling the IoT based entrance to deny access to the user of the identification device.

15. A non-transitory computer readable medium storing computer executable code, wherein the computer executable code, when executed at a processor of an internet of things (IoT) device for an IoT based entrance, is configured to:

receive, from an identification device through a wireless network, a request to establish a secured connection, wherein the IoT device is configured to store a secret key for generating a first time-based password, and the request comprises a wireless address of the identification device;

verify the wireless address of the identification device;

when the wireless address of the identification device is verified, establish the secured connection with the identification device through the wireless network;

receive, from the identification device through the secured connection, a second time-based password generated by the identification device;

generate the first time-based password based on an access time and the secret key;

determine whether the second time-based password received from the identification device matches the first time-based password generated by the IoT device; and when the second time-based password received from the identification device matches the first time-based password, control the IoT based entrance to grant access to a user of the identification device.

16. The non-transitory computer readable medium as claimed in claim 15, wherein the identification device is a mobile device storing a copy of the secret key, wherein the mobile device is configured to obtain permission for the user of the identification device by:

generating the request with the wireless address of the mobile device, and sending the request to the IoT device through the wireless network to establish the secured connection with the IoT device through the wireless network;

receiving, from the IoT device, a notification to establish the secured connection;

in response to the notification, generating the second time-based password based on the access time and the secret key; and sending the password to the IoT device through the secured connection to obtain permission for the user of the identification device.

17. The non-transitory computer readable medium as claimed in claim 16, wherein the mobile device is further configured to:

obtain the copy of the secret key from a remote computing device through a network, wherein the network is independent and separate from the wireless network.

18. The non-transitory computer readable medium as claimed in claim 15, wherein the wireless network is a Bluetooth network.

19. The non-transitory computer readable medium as claimed in claim 15, wherein the computer executable code comprises:
- a data store storing a plurality of authenticated wireless addresses and the secret key;
- a wireless connection module configured to:
  - receive the request to establish the secured connection;
  - establish the secured connection with the identification device through the wireless network; and
  - receive the second time-based password through the secured connection;
- an address filtering module configured to:
  - retrieve the wireless address of the identification device from the request,
  - compare the wireless address of the identification device with the authenticated wireless addresses stored in the data store, and
  - determine that the wireless address of the identification device is verified when the wireless address of the identification device matches with one of the authenticated wireless addresses stored in the data store;
- a password verification module configured to:
  - obtain a current time as the access time of the identification device,
  - retrieve the secret key from the data store,
  - generate the time-based one time password based on the access time and the secret key, and
  - determine whether the password received from the identification device matches the time-based one time password generated by the IoT device; and
- an entrance control module configured to, when the password received from the identification device matches the time-based one time password, control the IoT based entrance to grant access to the user of the identification device.

20. The non-transitory computer readable medium as claimed in claim 19, wherein the data store stores a plurality of secret keys, and the password verification module is configured to retrieve the secret key by selecting, from the plurality of secret keys, one of the secret keys corresponding to the identification device based on the wireless address of the identification device.

* * * * *